US011714168B2

(12) United States Patent
Diaz

(10) Patent No.: US 11,714,168 B2
(45) Date of Patent: Aug. 1, 2023

(54) OPTICAL CIRCULATOR

(71) Applicant: Baraja Pty Ltd., New South Wales (AU)

(72) Inventor: Fernando Diaz, Lindfield West (AU)

(73) Assignee: BARAJA PTY LTD., Lindfield West (AU)

(*) Notice: Subject to any disclaimer, the term of this patent is extended or adjusted under 35 U.S.C. 154(b) by 462 days.

(21) Appl. No.: 16/759,701

(22) PCT Filed: Oct. 31, 2018

(86) PCT No.: PCT/AU2018/051175
§ 371 (c)(1),
(2) Date: Apr. 27, 2020

(87) PCT Pub. No.: WO2019/084610
PCT Pub. Date: May 9, 2019

(65) Prior Publication Data
US 2020/0333441 A1 Oct. 22, 2020

(30) Foreign Application Priority Data

Nov. 1, 2017 (AU) .............................. 2017904450
Jun. 15, 2018 (AU) .............................. 2018902139

(51) Int. Cl.
G01S 7/481 (2006.01)
G01S 7/499 (2006.01)
(Continued)

(52) U.S. Cl.
CPC .......... *G01S 7/4812* (2013.01); *G01S 7/4815* (2013.01); *G01S 7/4818* (2013.01); *G01S 7/499* (2013.01);
(Continued)

(58) Field of Classification Search
None
See application file for complete search history.

(56) References Cited

U.S. PATENT DOCUMENTS 5,319,483 A * 6/1994 Krasinski ................ G02F 1/093
385/11
5,479,082 A * 12/1995 Calvani ............... H04J 14/0206
385/39
(Continued)

FOREIGN PATENT DOCUMENTS

EP 1065551 A2 1/2001
EP 3081956 A1 10/2016
(Continued)

OTHER PUBLICATIONS

Japanese First Office Action dated Jul. 5, 2022 in related Japanese Patent Application No. 2020-523806 (eight pages).
(Continued)

*Primary Examiner* — Eric L Bolda
(74) *Attorney, Agent, or Firm* — Kilpatrick Townsend & Stockton LLP

(57) ABSTRACT

Various forms of optical circulator are disclosed. The optical circulators act on polarisation of the light to direct light between its ports. Also disclosed are systems and methods for facilitating estimation of a spatial profile of an environment based on a light detection and ranging (LiDAR) based technique. The systems and method may include or use one or more of the various forms of optical circulator. In one arrangement, the present disclosure facilitates spatial profile estimation based on directing light over one dimension, such as along the vertical direction. In another arrangement, by further directing the one-dimensionally directed light in another dimension, such as along the horizontal direction,
(Continued)

the present disclosure facilitates spatial profile estimation based on directing light in two dimensions.

14 Claims, 12 Drawing Sheets

(51) Int. Cl.
*G02F 1/09* (2006.01)
*G01S 17/89* (2020.01)
*H04B 10/11* (2013.01)
*H04B 10/66* (2013.01)

(52) U.S. Cl.
CPC .............. *G01S 17/89* (2013.01); *G02F 1/093* (2013.01); *H04B 10/11* (2013.01); *H04B 10/66* (2013.01)

(56) References Cited

U.S. PATENT DOCUMENTS

| | | | |
|---|---|---|---|
| 6,339,661 B1* | 1/2002 | Kokkelink | G02F 1/093 385/11 |
| 6,377,720 B1 | 4/2002 | Kokkelink | |
| 6,459,826 B1* | 10/2002 | Boivin | H04Q 11/0005 385/11 |
| 6,535,324 B1* | 3/2003 | Hwang | G02F 1/093 359/283 |
| 7,715,664 B1* | 5/2010 | Shou | G02B 6/4208 385/11 |
| 2002/0126945 A1 | 9/2002 | Konishi et al. | |
| 2004/0086214 A1 | 5/2004 | Huang et al. | |
| 2006/0044650 A1* | 3/2006 | Du | G02B 27/283 359/489.09 |
| 2016/0259128 A1* | 9/2016 | Wagener | G02B 6/3594 |
| 2018/0128904 A1 | 5/2018 | Haslim | |

FOREIGN PATENT DOCUMENTS

| | | | |
|---|---|---|---|
| JP | 9-127463 A | | 5/1997 |
| JP | 9127463 | * | 5/1997 |
| JP | 2000-2819 A | | 1/2000 |
| JP | 2012-207934 A | | 10/2012 |
| JP | 2013-160717 A | | 8/2013 |
| JP | 2015-517094 A | | 6/2015 |
| WO | 2016/097409 A2 | | 6/2016 |
| WO | 2017/054036 A1 | | 4/2017 |

OTHER PUBLICATIONS

International-Type Search Report dated Aug. 2, 2018, in Australian Patent Application No. 2018902139, filed Jun. 15, 2018, 14 pages.
International Search Report of the International Searching Authority dated Feb. 4, 2019, in International Patent Application No. PCT/AU2018/051175, filed Oct. 31, 2018, 6 pages.
Written Opinion of the International Searching Authority dated Feb. 4, 2019, in International Patent Application No. PCT/AU2018/051175, filed Oct. 31, 2018, 11 pages.
International Preliminary Report on Patentability dated May 5, 2020 in related International Application PCT/AU2018/051175 (twelve pages).

* cited by examiner

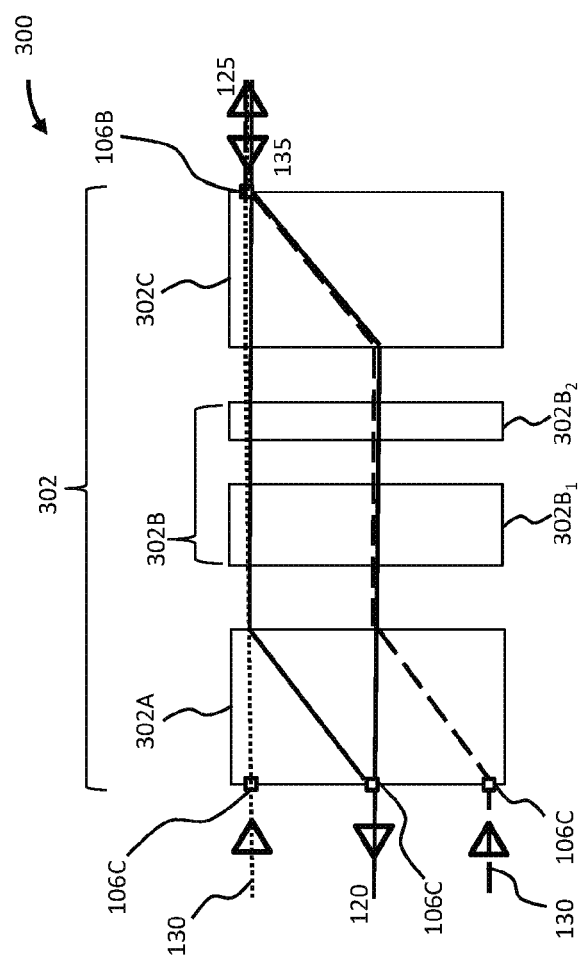

OPTICAL CIRCULATOR

FIELD OF THE INVENTION

The present invention generally relates to the field of optical circulators. Particular embodiments relate to a system and method for facilitating estimation of a spatial profile of an environment, for example based on directing light over at least one dimension.

BACKGROUND OF THE INVENTION

Spatial profiling refers to the mapping of an environment as viewed from a desired origin point. Each point or pixel in the field of view is associated with a distance to form a representation of the environment. Spatial profiles may be useful in identifying objects and/or obstacles in the environment, thereby facilitating automation of tasks.

One technique of spatial profiling involves sending light into an environment in a specific direction and detecting any light reflected back from that direction, for example, by a reflecting surface in the environment. The reflected light carries relevant information for determining the distance to the reflecting surface. The combination of the specific direction and the distance forms a point or pixel in the representation of the environment. The above steps may be repeated for multiple different directions to form other points or pixels of the representation, thereby facilitating estimation of the spatial profile of the environment within a desired field of view.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE DISCLOSURE

An optical circulator is disclosed. Also disclosed is an optical system. Also disclosed is an optical system for facilitating estimation of a spatial profile of an environment. The optical system may include the optical circulator.

In some embodiments the optical circulator includes an input port to receive light (e.g. from a source), a bidirectional port to send light to the environment and receive light from the environment, and an output port to output light (e.g. to a receiver). The output port is spatially displaced from the input port. A core is configured to cause direction of light from the input port to the bidirectional port and from the bidirectional port to the output port. The core is configured to cause said direction of light by separating the light into distinct polarisations and directing one or both polarisations through the core.

In certain embodiments the optical circulator includes an input port to receive light, an output port to output light, the output port being spatially displaced from the input port; and a core configured to cause direction of light from the input port to an outgoing light path and to cause direction of light from an incoming light path to the output port, wherein the outgoing light path and the incoming light path are spatially arranged to at least partially overlap.

In certain embodiments an optical circulator includes at least one input port and at least one output port and in optical communication with the at least one input port and at least one output port a first birefringent crystal, a non-reciprocal polarisation-rotating element following the first birefringent crystal, and a second birefringent crystal following the non-reciprocal polarisation-rotating element. The first birefringent crystal includes a first surface rotated by a first non-zero amount relative to a first axis transverse to a direction of travel of light through the optical circulator and the second birefringent crystal includes a second surface rotated by the first or a second non-zero amount relative to the first axis, wherein the first surface and the second surface are rotated in opposite directions.

In certain embodiments an optical circulator includes at least one input port and at least one output port and an optical assembly in optical communication with the at least one input port and at least one output port, the optical assembly including a first birefringent crystal, a non-reciprocal polarisation-rotating element following the first birefringent crystal, and a second birefringent crystal following the non-reciprocal polarisation-rotating element. The non-reciprocal polarisation-rotating element comprises a first component, for example a half-waveplate element and a second component, for example a Faraday rotator. The first component includes a first surface rotated by a first non-zero amount relative to a first axis transverse to a direction of travel of light through the optical circulator and the second component crystal includes a second surface rotated by the first or a second non-zero amount relative to the first axis, wherein the first surface and the second surface are rotated in opposite directions.

In certain embodiments the system for facilitating estimation of a spatial profile of an environment includes a light source configured to provide outgoing light at selected one or more of multiple wavelength channels, a light detector configured to detect incoming light, the incoming light corresponding to at least part of the outgoing light reflected by the environment, an optical circulator, and a beam steerer. The optical circulator is configured to receive the outgoing light via one or more input ports, send the received outgoing light via a bidirectional port towards an outgoing path, receive the incoming light on an incoming path via the bidirectional port, such that the outgoing path and the incoming path are spatially arranged to at least partially overlap, and send the received incoming light via an output port to the light detector, the output port being spatially displaced from the one or more input ports. The beam steerer is configured to direct the outgoing light on the outgoing path towards the environment into one or more respective outgoing directions, the one or more respective outgoing directions based on the selected one or more of multiple wavelength channels, and direct the incoming light being reflected from the environment on to the incoming path towards the optical circulator. At least one characteristic associated with the detected light includes information for estimation of the spatial profile of the environment associated with the one or more outgoing directions.

In certain embodiments the optical system includes a light source configured to provide outgoing light, a light receptor configured to receive incoming light and an optical circulator. The optical circulator is configured to receive the outgoing light via one or more input ports, send the received outgoing light via a bidirectional port directly to an outgoing path in a free space environment, receive the incoming light on an incoming path in the free space environment via the bidirectional port, the outgoing path and the incoming path spatially arranged to at least partially overlap, and send the received incoming light via at least one output port to the light receptor, the at least one output port being spatially displaced from the one or more input ports.

In certain embodiments an optical circulator includes at least one input port and at least one output port and an optical assembly in optical communication with the at least one input port and at least one output port. The optical assembly includes a first birefringent crystal, a non-reciprocal polarisation-rotating element following the first birefringent crystal, and a second birefringent crystal following the non-reciprocal polarisation-rotating element. The optical assembly includes a first surface to receive light from the at least one input port, the first surface rotated so as to be not substantially perpendicular to a direction of travel of light through the optical circulator and a second surface to receive light from the at least one input port, the second surface displaced from the first surface and rotated so as to be not substantially perpendicular to a direction of travel of light through the optical circulator in an opposite direction to the first surface.

Further aspects of the present disclosure and further embodiments of the aspects described in the preceding paragraphs will become apparent from the following description, given by way of example and with reference to the accompanying drawings and from the accompanying claims.

BRIEF DESCRIPTION OF THE DRAWINGS

FIGS. 3A-3D illustrates other examples of optical circulators.

DETAILED DESCRIPTION OF EMBODIMENTS

Figure 1:
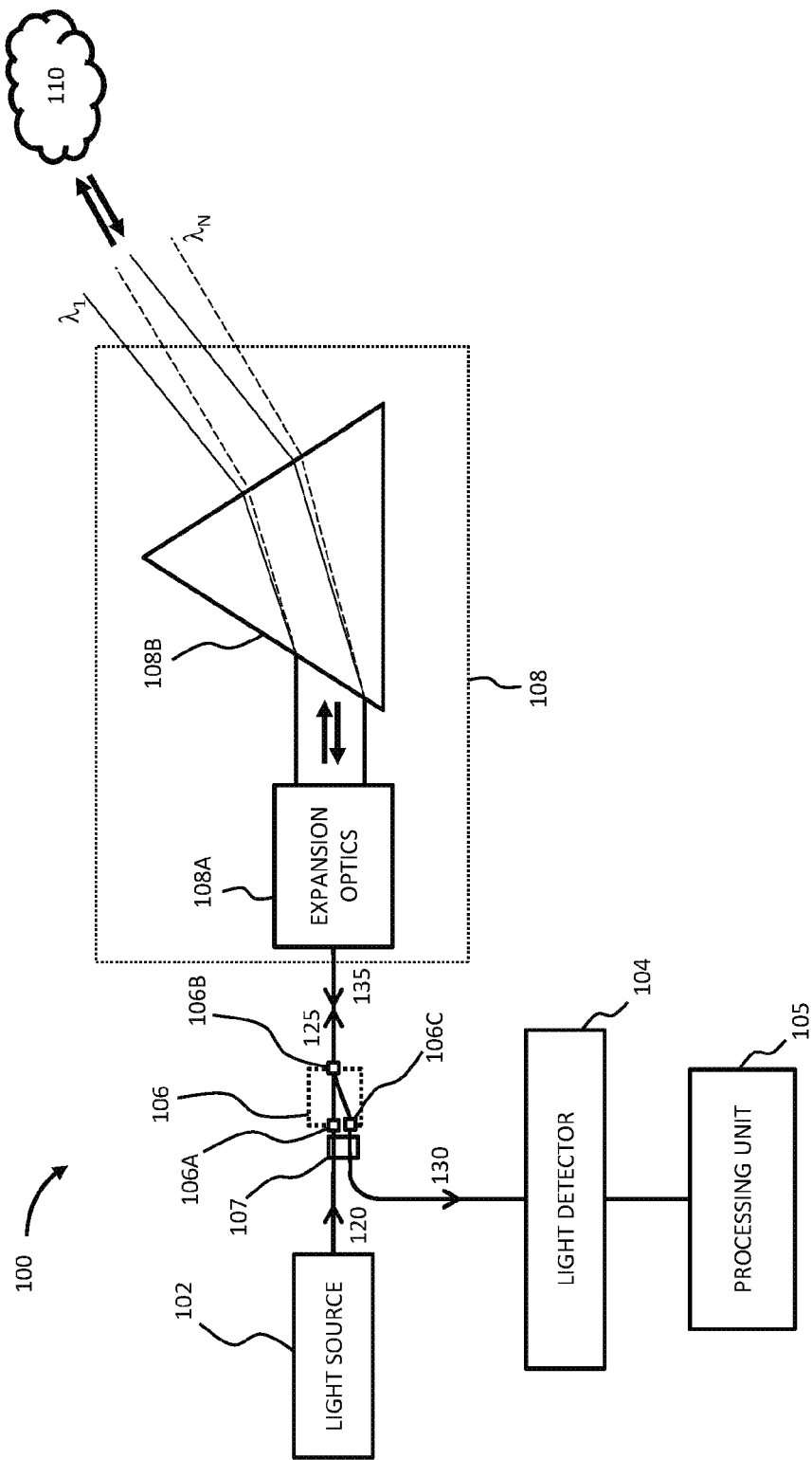
FIG. 1 illustrates an arrangement of a disclosed system to facilitate estimation of the spatial profile of an environment.

Disclosed herein are forms of optical circulator. The optical circulator includes characteristics that provide a high directivity. An example application of the optical circulator is in a system for spatial profile estimation. Another example application of the optical circulator is in a system for free space optical communication or free space measurement, for example based on the Doppler Effect.

Also disclosed herein is a system and method for facilitating estimation of a spatial profile of an environment based on a light detection and ranging (LiDAR) based technique. "Light" hereinafter includes electromagnetic radiation having optical frequencies, including far-infrared radiation, infrared radiation, visible radiation and ultraviolet radiation. In general, LiDAR involves transmitting light into the environment and subsequently detecting reflected light returned by the environment. By determining the time it takes for the light to make a round trip to and from, and hence the distance of, reflecting surfaces within a field of view, an estimation of the spatial profile of the environment may be formed. In one arrangement, the present disclosure facilitates spatial profile estimation based on directing light over one dimension, such as along the vertical direction. In another arrangement, by further directing the one-dimensionally directed light in another dimension, such as along the horizontal direction, the present disclosure facilitates spatial profile estimation based on directing light in two dimensions.

The inventors recognise that, where a LiDAR system is arranged to have separate or otherwise misaligned transmitting and receiving optical paths to reduce cross-talk that would otherwise overwhelm the return signal, one or more detection blind-spots in the system's line of view (in the one-dimensional case) or field of view (in the two-dimensional case) may result. In recognition of this deficiency, the inventors have devised a number of optical designs allowing coaxial or otherwise aligned transmitting and receiving optical paths to reduce such blind-spots and cross-talk. These optical designs make use of an optical circulator, which provides a high degree of directivity, for example at least 70 dB, or at least 75 dB, or at least 80 dB, or at least 85 dB, or at least 90 dB, between its input port (coupled to a light source) and output port (coupled to a light detector), while providing a bi-directional port for transmitting and receiving light to and from the environment. In some embodiments the optical designs include a single input port and a single output port.

Other embodiments include two or more input ports, with each input port having a corresponding output port and bidirectional port. The two or more input ports and two or more output ports may be provided in a single optical circulator.

Certain embodiments include two or more bidirectional ports, with each bidirectional port having at least one corresponding output port and at least one corresponding input port. The two or more bidirectional ports may each form independent circulators and utilise the same circulator core.

Embodiments with plural input ports, output ports and bidirectional ports enable the simultaneous detection of multiple targets.

System Example 1

In a general form, as illustrated in FIG. 1, the described system 100 includes at least one light source 102 configured to provide outgoing light 120 at one or more wavelength channels (e.g. centred at $\lambda_1$ to $\lambda_N$). For example, the light source 102 may comprise a laser configured to selectively output one wavelength channel at a time. The system 100 also includes at least one light detector 104 configured to detect incoming light 130, an optical circulator 106 and a beam steerer 108. The incoming light 130 corresponds to at least part of the outgoing light 120 reflected by the environment 110. The optical circulator 106 is configured to (a) receive the outgoing light 120 via one or more input ports 106A, (b) send the received outgoing light 120 via one or more bidirectional ports 106B towards an outgoing path 125 in a free space environment, (c) receive the incoming light on an incoming path 135 in the free space environment via the bidirectional port(s) 106B, and (d) send the received incoming light 130 via one or more output ports 106C to the at least one light detector 104. Reference to light transmitting in the free space should be read as light transmission not being confined within any type of optical waveguides including optical fibre, optical tubes or similar structures.

The beam steerer 108 is configured to (a) direct the outgoing light 120 on the outgoing path 125 towards the environment 110 into one or more respective outgoing directions, based on the selected wavelength channel and/or the selected input port of the circulator, and (b) direct the incoming light 130 being reflected from the environment 110 on to the incoming path 135 towards the optical circulator 106. The beam steerer 108 may include expansion optics 108A to enlarge the beam size for better divergence characteristics. In one variant, the beam steerer 108 includes a dispersive element 108B, such as a grating, prism or grism, to provide wavelength-dependent angular dispersion. Examples of the beam steerer 108 are disclosed in one or more of the applicant's co-pending applications, including PCT application no. PCT/AU2016/050899 published as WO 2017/054036 A1 on 6 Apr. 2017, the entirety of which is incorporated herein by reference. At least one characteristic associated with the detected light includes information for estimation (e.g. by processing unit 105) of the spatial profile of the environment associated with the one or more outgoing directions.

The optical circulator 106 is arranged such that the outgoing path 125 and the incoming path 135 are spatially arranged to at least partially overlap, while the output port 106C is spatially displaced from the one or more input ports 106A. The at least partially overlapped outgoing and incoming paths facilitate embodiments that avoid the aforementioned blind spots, while the spatial displacement between the input and output port and the direct communication of the optical circulator 106 to free space instead of to an intervening or intermediary optical waveguide provides improved directivity to avoid overwhelming the return signal.

The optical circulator 106 may be realised in a number of ways. Examples of the optical circulator 106 are described as follows. Herein, a "port" is intended to denote or illustrates an area in space, such as an aperture, through which a light beam passes, and does not necessarily require presence of a physical component to define the port. In some embodiments the optical circulator includes or is connected to an optical array, such as a V-groove array 107 or a bundled fibre, to align an optical fibre with a port of the optical circulator. In particular, one or more of the input ports 106A and/or one or more of the output ports 106C are associated with a V-groove array or bundled fibre to align the optical fibre with the port.

As illustrated, in some embodiments the optical beams from the optical fibre are directly provided to the optical circulator 106. That is, there are no mode expansion optical components, such as one or more lenses, placed between the fibre and the optical circulator. One benefit of the absence of such mode expansion optical components may be eliminating light reflection at the surface of such components back to the system, which in turn may improve directivity. In some embodiments, directivity can be positively affected by deploying any one or more of overlapping outgoing and incoming paths, direct communication of the optical circulator to free space and direct communication of light from optical waveguide(s) to at least the input port of the optical circulator.

One embodiment of the system 100 includes a single optical circulator 106. Other embodiments include two or more optical circulators 106. For example, in one embodiment two or more optical circulators 106 operate in parallel, providing parallel optical paths for detection by one or more light detectors 104. Accordingly, the system 100 includes an array of a plurality of input ports 106A and an array of a plurality of bidirectional ports 106B. In some embodiments the number of input ports 106A equals the number of bidirectional ports 106B. In other embodiments there are a different number of input ports to bidirectional ports. The array of ports may be optically coupled to a single light source 102 and a single beam director 108, or in other embodiments a plurality of light sources 102 and/or a plurality of beam directors 108 are provided, each optically coupled with a subset of the ports.

In embodiments with parallel ports, the system 100 may be configured so that a first port couples light at a first wavelength or across a first range of wavelengths and a second port couples light at a second wavelength or across a second range of wavelengths, different from the first wavelength and first range of wavelengths respectively. For example where the parallel ports are provided across a plurality of optical circulators 106, each optical circulator may be configured to operate at its respective wavelength or range of wavelengths. In one embodiment one or more of the ports or optical circulators are configured to be inoperative for at least one wavelength or range of wavelength that another of the ports or optical circulators is configured to be operative for.

Example 1

Figure 2:
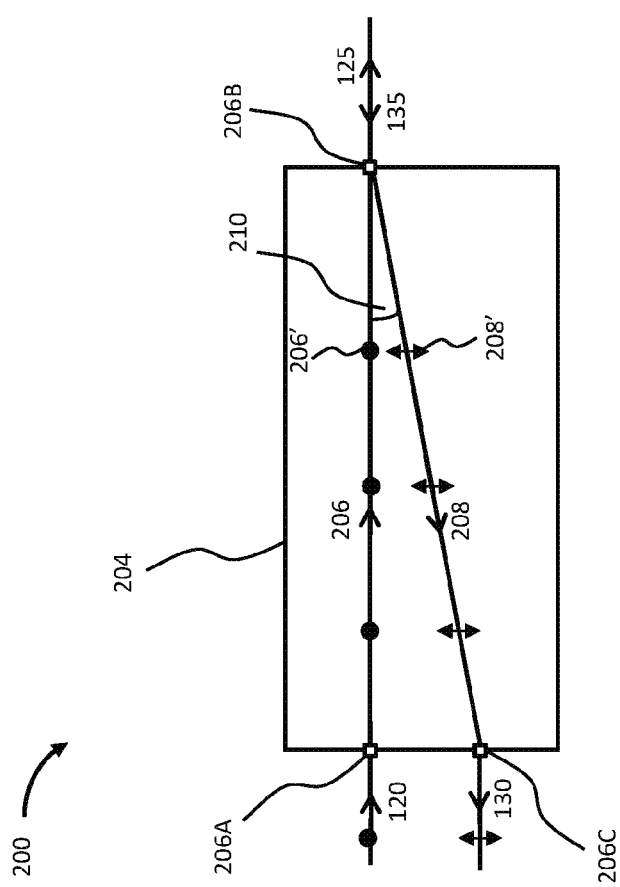
FIG. 2 illustrates an example optical circulator.

In one example, the optical circulator 200, as illustrated in FIG. 2, which may be the optical circulator 106 of FIG. 1, includes one input port 206A, one bidirectional port 206B, one output port 206C, and a beam displacer 204 configured to displace an outgoing beam 206 (travelling from port 206A to port 206B) from an incoming beam 208 (travelling from port 206B to port 206C). The beam displacer 204 includes a birefringent element, such as yttrium orthovanadate (YVO4), for displacing the incoming beam 208 from the outgoing beam 206 by the walk-off angle 210 associated with the birefringent element. The outgoing beam 206 when entering the beam displacer 204 via the input port 206A is rotated to or otherwise maintained at a first polarisation 206' (e.g. an ordinary beam or o-beam), whereas the incoming beam 208 when entering the beam displacer 204 via the bidirectional port 206B is rotated to or otherwise maintained at a second polarisation 208' (e.g. an extraordinary beam or e-beam), orthogonal to the first polarisation 206'.

The beam displacer 204 is arranged to receive the outgoing beam 120 including a component oriented at a first polarisation 206' (e.g. an o-beam) via its input port 206A, send the received outgoing light 206 out via its bidirectional port 206B, receive the reflected light 135 via its bidirectional port 206B, and send the received reflected light 208 which has component oriented at a second polarisation 208' different to the first polarisation, for example orthogonal to the first polarisation 206' (e.g. an e-beam), to the detector 104 via its output port 206C. The angle of displacement is referred to herein as a "walk-off angle". In one embodiment, the beam displacer 204 relies on the de-polarisation state of the reflected light 135 to achieve the second orthogonal polarisation 208'. In another embodiment, the optical circulator 200 includes at least one waveplate (not shown) after the bidirectional port 206B of the beam displacer 204 for rotating the outgoing polarisation 206' to the incoming polarization 208'. For example, the waveplate may be a quarter-waveplate oriented at 45° to the first polarisation 206', placed immediately after the bidirectional port 206B. In this example, the desired rotation may be achieved at relatively low material cost. The quarter-waveplate may be oriented at an angle other than 45° (e.g. 25°) to the first polarisation 206' to facilitate reduction of specular reflections from highly reflective targets which may otherwise overwhelm the light detector 104. In another embodiment, the optical circulator 200 may include a non-reciprocal polarisation-rotating element anywhere after the bidirectional port 206B of the beam displacer 204 for rotating the outgoing polarization 206' to the incoming polarization 208'. For example, the non-reciprocal polarisation-rotating element maybe a Faraday rotator and a half wave-plate oriented 22.5° to the polarization 206' placed immediately after the bidirectional port 206B.

In one embodiment, the light source 102 is optically coupled to the beam displacer 204 at its input port 206A via a polarisation-maintaining (PM) optical fibre. In the same or a different embodiment, the detector 104 is optically coupled to the beam displacer 204 at its output port 206C via a multimode (MM) optical fibre. In the same or a different embodiment, the optical circulator 200 includes one or more focussing elements, such as an aspheric lens (not shown) to focus and/or collimate light into and/or out of ports 206A, 206B and 206C. In one embodiment a waveplate, for example a quarter-waveplate, is provided on each side of the one or more focussing elements.

The optical circulator 200 may include one or more substrates to align the optical paths, for example one or more glass substrates configured to hold multiple fibres at relative positions to each other with high accuracy (called herein a "V-groove array"). For example a V-groove array may be used to align each of the PM and MM optical fibres to the corresponding input and output ports of the beam displacer 204, thereby forming a fibre array. Use of a V-groove array may facilitate embodiments with reduced crosstalk between the input and output port while minimising their spatial separation. Furthermore, its use imparts accurate positioning between the PM and MM fibres, typically within +/−1 μm, which enables a substantial spatial overlap and avoids active alignment as the V-groove array is matched by design to the crystal dimensions.

In some embodiments the optical elements of the optical circulator 200 are configured to achieve a required combination of cross-talk performance and collection efficiency. For example, the optical elements may be configured to achieve cross-talk at or below 70 dB, or at or below 80 dB, in combination with a collection efficiency at or above 90%.

Example 2

Figure 3A:
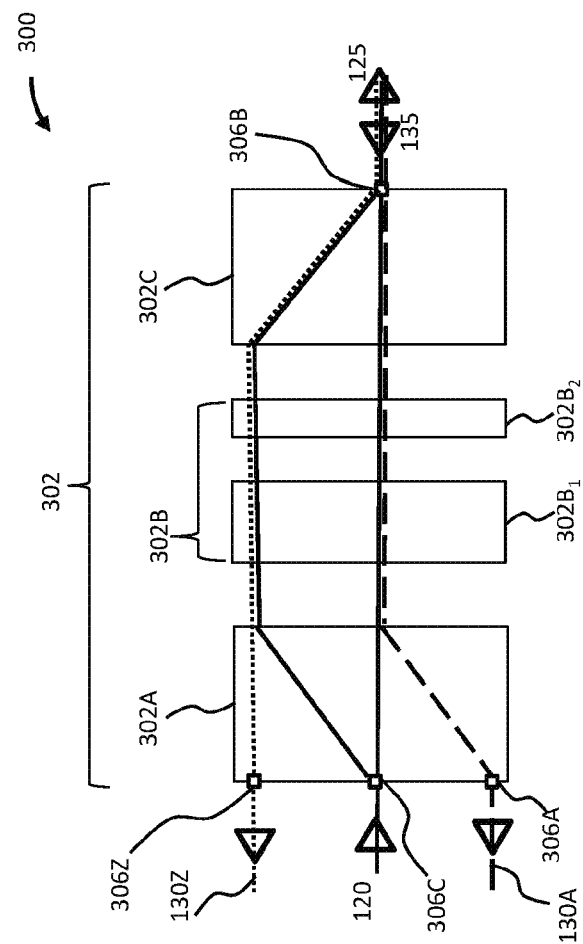
Figure 3B:
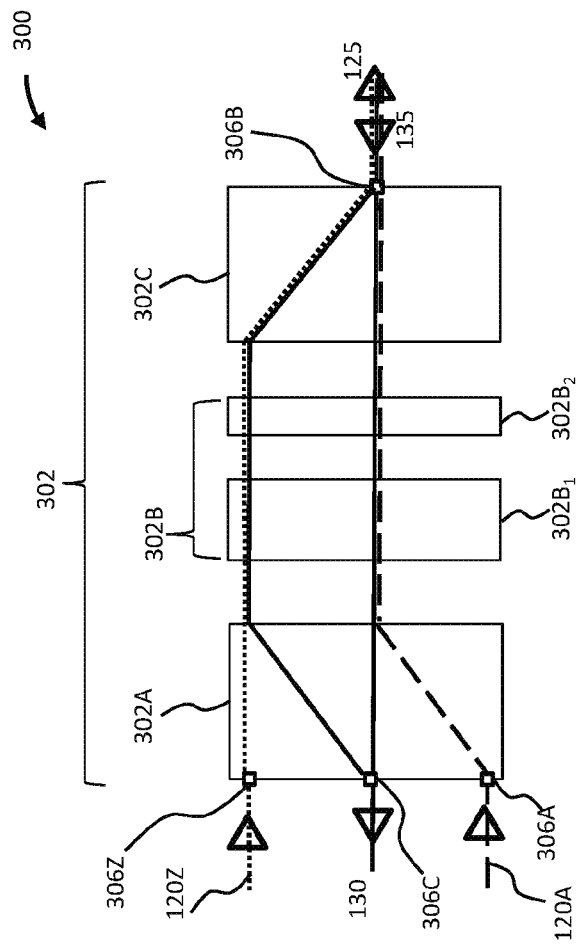
Figure 3C:
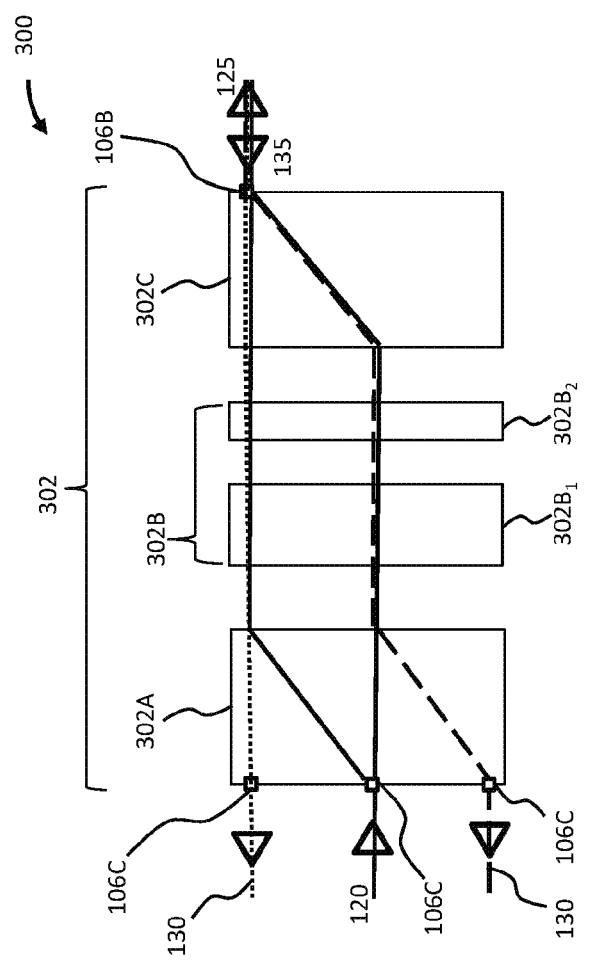

In another example, as illustrated in FIG. 3, the optical circulator 300 (which again may be the optical circulator 106 of FIG. 1) includes a core 302. In order from left to right in the embodiments of FIGS. 3A, 3B, 3C, 3D the core 302 includes a first birefringent crystal 302A, a non-reciprocal polarisation-rotating element 302B following the first birefringent crystal 302A, and a second birefringent crystal 302C following the non-reciprocal polarisation-rotating element 302B. In one arrangement, the non-reciprocal polarisation- rotating element 302B includes a non-reciprocal polarisation-rotating element 302B$_1$ and a half-waveplate 302B$_2$ to facilitate the non-reciprocity.

The two birefringent crystals 302A and 302C may have equal or opposite walk off angles to facilitate the recombination of the o-beam and e-beam, as illustrated by the embodiments in FIGS. 3A, 3B and FIGS. 3C, 3D. In the first arrangement, with opposite walk off angles, the non-reciprocal polarisation-rotating element 302B is set to rotate the outgoing beam but does not rotate the incoming beam. In the second configuration, with equal walk off angles, the non-reciprocal polarisation-rotating element 302B is set to rotate the incoming beam but does not rotate the outgoing beam.

The optical circulator 300 may be used in one of two ways. In a first use, as illustrated in FIG. 3A, the port 306C is an input port for receiving outgoing light 120 containing any polarisation state (e.g. having both vertical and horizontal polarisation components). The optical circulator 300A may include an optical fibre (e.g. SM fibre) configured to be optically coupled to the input port 306C to carry outgoing light from the light source 102. For outgoing light 120 travelling towards the outgoing path 125 (see solid lines), the first birefringent crystal 302A separates the o-beam from the e-beam component by the walk-off angle. The non-reciprocal polarisation-rotating element 302B leaves each component unaffected as in this direction of travel the Faraday Rotator compensates the half waveplate resulting in a net rotation of 0 degrees. The second birefringent crystal 302C then recombines the two components at the bidirectional port 306B to form the outgoing light 120 along the outgoing path 125.

For light travelling on the incoming path 135 (see dotted and dashed lines), the second birefringent crystal 302C separates the o-beam from the e-beam component by the walk-off angle. The non-reciprocal polarisation-rotating element 302B rotates the polarization of each component as in this direction of travel the Faraday Rotator adds to the half waveplate, resulting in a net rotation of 90 degrees. The first birefringent wedge 302A then separates the components further. The separated beams are then collected at ports 306A and 306Z respectively to form incoming light 103A and 103Z respectively. The optical circulator 300A may include an optical fibre (e.g. PM fibre) configured to be optically coupled to the input port 306C to carry outgoing light from the light source 102. The detector 104 is optically coupled to the core 302 at either or both its output ports 306A and 306Z via a multimode (MM) optical fibre(s). The optical circulator 300A may include a V-groove array (not shown) to align each of the PM and MM optical fibres to the correspondence input and output ports.

In this first use, where the optical fibre is a PM fibre carrying a single input polarization (e.g. vertically polarised light), detection of the polarization state of the reflected light (e.g. by detecting the relative received power of the incoming light 130A and 130Z as compared to the input polarisation) facilitates the detection of a depolarization rate of a reflected light. Based on the detected depolarization rate, the reflecting surface may be determined to be, or more likely to be, metallic. For example, if the detected depolarization rate is determined to be above a threshold depolarization rate, the reflecting surface may be determined to be, or more likely to be, metallic. On the contrary, if the detected depolarization rate is determined to be below a threshold depolarization rate, the reflecting surface may be determined to be, or more likely to be, non-metallic. Alternatively or additionally, based on the detected of the polarization state of the reflected light, specular reflecting surface (e.g. retro-reflectors) may be detected.

In a second use, as illustrated in FIG. 3B either or both of the ports 306A and 306Z are input ports for an o-beam 120A and an e-beam 120Z, respectively. In FIG. 3B the outgoing light (e.g. light from the light source 102) is indicated by dashed and dotted lines and the light arriving on the incoming path (e.g. light from the environment 110) is indicated in solid lines (i.e. the reverse of FIG. 3A). The optical circulator 300B may include PM fibres configured to be optically coupled to the input ports 306A and 306Z and carry outgoing light from the light source 102. The operation in the second use is similar to that of the first use, except that the input port(s) and output port(s) are swapped, and the decomposed polarisation states are swapped between the forward direction and the backward direction. Description on the optical circulator 300A is therefore applicable to the optical circulator 300B with minor modifications.

In this second use, either or both of the e-beam and the o-beam may be used depending, for example, on power and sensitivity requirements. In the same or different variant, the detector 104 is optically coupled to the core 302 at its output port 306C via a multimode (MM) optical fibre. Alternatively or additionally, a PM optical amplifier (e.g. erbium-doped fibre amplifier) is not necessary. Instead, a polarisation beam splitter fibre may be used to couple light into the two PM fibres.

FIG. 3C and FIG. 3D illustrate alternative uses in an analogous way to FIG. 3A and FIG. 3B. In FIG. 3C and FIG. 3D like components to those described with reference to FIG. 1 are given the same reference numerals as in FIG. 1. In FIG. 3C the outgoing light (e.g. light from the light source 102) is indicated by solid lines and the light arriving on the incoming path (e.g. light from the environment 110) is indicated by dashed and dotted lines and in FIG. 3D these indications are reversed.

The optical circulator 300A or 300B may include a V-groove array (not shown) to align each of the SM, PM and MM optical fibres to the correspondence input and output ports of the core 302. The optical circulator 300A or 300B may include one or more focussing elements, such as an aspheric lens, (not shown) to focus light onto the input port(s) and/or collimate light out of the output port(s).

System Example 2

Figure 4:
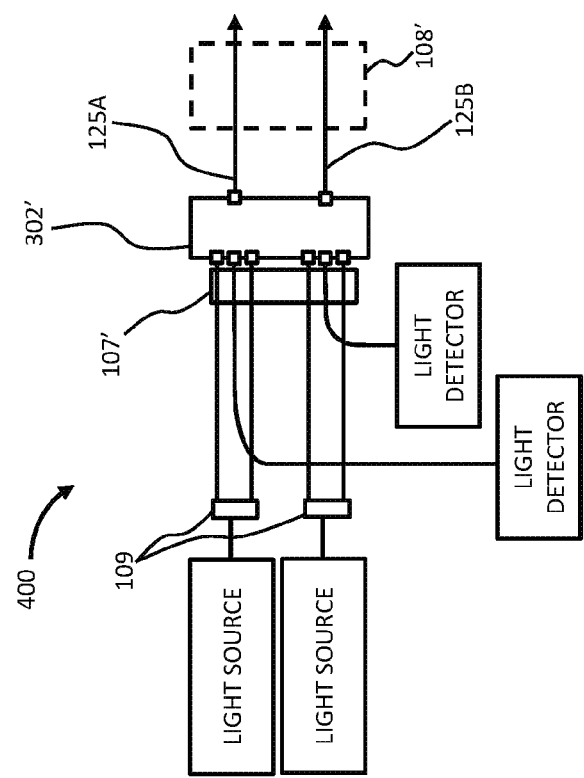
FIG. 4 illustrates another arrangement of a disclosed system to facilitate estimation of the spatial profile of an environment.

In a general form, as illustrated in FIG. 4, the described system 400 includes an optical circulator 302', for example an optical circulator selected from the optical circulators described herein. In one embodiment the optical circular 302' includes two or more optical circulators, for example two or more optical circulators selected from the optical circulators herein described.

In some embodiments the optical circulator 302' includes two or more optical circulators 302 as described with reference to FIG. 3B. Each optical circulator 302 in the optical circulator 302' receives, via fibre optic cables positioned by a V-groove array 107' two input light signals from one or more light sources. Accordingly, the output light from each fibre optical cable is directly provided to the optical circulator 302'.

In some embodiments the optical circular 302' has a sufficiently large aperture so that the same core is used for each of two or more light sources.

In some embodiments a splitter 109 is provided between the respective light source and the V-groove array 107' to provide two light signals over respective fibre optic cables.

In the example shown in FIG. 4, a first outgoing light path 125A and a second outgoing light path 125B provide light to the environment, via a beam steerer 108', which in the example of two signals is a dual beam steerer. Light returned from the environment is directed to one of the two light detectors by their associated optical circulator 302 in the optical circulator 302'. The transition to and from free space is at the bidirectional port(s) of the optical circulator, which as explained with reference to system example 1 may improve directivity in comparison to a system in which there is a waveguide at the bidirectional port(s).

In one embodiment the dual beam steerer 108' controls the direction of light from the outgoing light paths 125A, 125B independently. In another embodiment the direction of light from the outgoing light paths 125A, 125B are interrelated, for example due to having a fixed angle offset.

In another embodiment a single light detector is provided to detect light from the optical circulators 302 in the optical circulator 302'. A processing unit 105 (see FIG. 1) then discriminates the detected light.

In other examples, three or more light sources may be provided, connected to one or more optical circulators. In these or other examples another form of optical circulator from the optical circulator 302 may be used. In some examples the optical circulators are of the same type. In other examples the optical circulators are of a different type (e.g. one as described with reference to FIG. 3A and one as described with reference to FIG. 3B).

Example 3

In another example, as illustrated in FIG. 5, the optical circulator 500 (which again may be the optical circulator 106 of FIG. 1) includes a core 502. In order from left to right in the embodiment of FIG. 5 the core 502 includes a first birefringent crystal 502A, a non-reciprocal polarisation-rotating element 502B following the first birefringent element 502A, a second birefringent crystal 502C following the non-reciprocal polarisation-rotating element 502B. In one arrangement, the non-reciprocal polarisation-rotating element 502B includes a half-waveplate element $502B_1$ and a Faraday rotator $502B_2$ to facilitate the non-reciprocity.

Figure 5A:
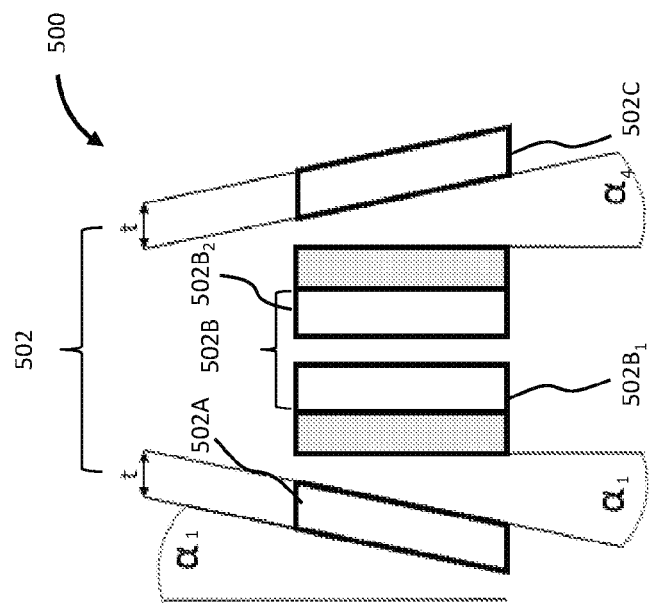
FIGS. 5A, 5B illustrate an example optical circulator.
Figure 5B:
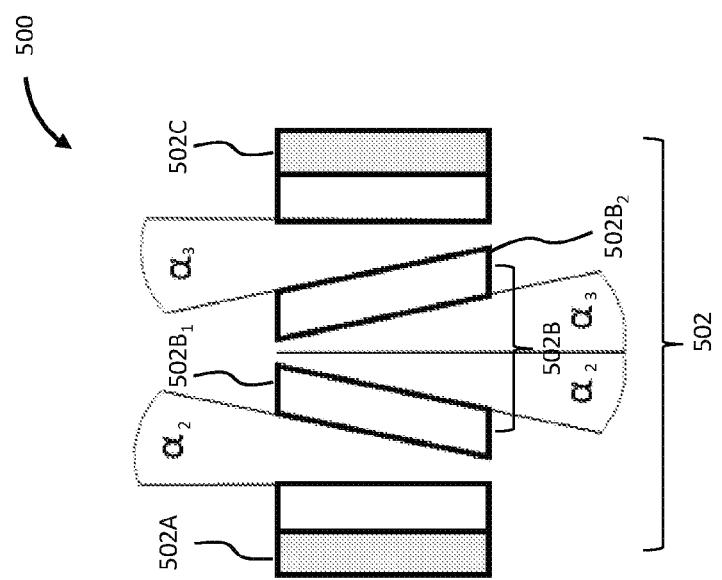

As illustrated from the side view in FIG. 5A and the top view in FIG. 5B, the first birefringent element 502A is provided angled in one axis (designated the y-axis in the figure) by $\alpha_1$ degrees. In the embodiment shown the rotation in the y-axis is in a clockwise direction. The half-waveplate $502B_1$ is provided angled in another axis (designated the x-axis in the figure) by $\alpha_2$ degrees, also clockwise. The Faraday rotator $502B_2$ is provided angled in the x-axis by $\alpha_3$ degrees in the counterclockwise direction, and the second birefringent crystal 502C is angled in y-axis by $\alpha_4$ degrees, also counterclockwise. In some embodiments, including the embodiment illustrated in FIG. 5, the x-axis and the y-axis are substantially transverse.

In some embodiments, including the embodiment illustrated in FIG. 5 for every element rotated in one axis in one direction there is a paired element rotated in the opposite direction in the same axis by substantially the same extent of rotation. In some embodiments one or more non-rotated elements may be provided in combination with the rotated elements. In some embodiments there are an even number (e.g. four in the embodiment of FIG. 5) of rotated elements to facilitate this pairing of rotated elements.

In some embodiments the extent of rotation is substantially the same for elements in different axes, for example the angles $\alpha_1$, $\alpha_2$, $\alpha_3$, and $\alpha_4$ have the same value (i.e. $\alpha_1=\alpha_2=\alpha_3=\alpha_4$). In other embodiments the extent of rotation is different between components rotated in different axes. For example, in some embodiments the angle $\alpha_1$ is equal to $\alpha_4$, while $\alpha_2$ differs from $\alpha_3$. It will be appreciated that by angled or rotated, it is meant that the extent of rotation of the component is non-zero, including not substantially zero.

The angles of rotation selected for the components may be optimised to improve directivity and collection efficiency. For example, the angles may be selected to keep aberrations introduced by non-collimated light beams entering the optical circulator 500 within a certain level and/or to alleviate light reflection back to the system. The angles formed between the components may range from approximately 12 degrees to approximately 30 degrees. Example angles include 11.8 degrees, 12.5 degrees, 15 degrees, 17.5 degrees, 20 degrees, 25 degrees and 30 degrees.

In some embodiments the directions of rotation are reversed, for example each component rotated clockwise in FIG. 5 is instead rotated counterclockwise and each component rotated counterclockwise is instead rotated clockwise.

In other arrangements, the axes of rotation are not transverse. For example, the components of the core may all be rotated in the same axis, for example all rotated in either the y-axis or the x-axis of FIG. 5. In another example the axes of rotation may be offset by a different amount, for example 120 degrees. In that example the core may include six components, rotated in pairs along three axes each 120 degrees offset from the other, the pairs rotated in opposite directions.

In some embodiments the thickness of the birefringent crystals 502A and/or 502C denoted as t in FIG. 5A is about 1 mm to about 1.5 mm. In one example, the thickness (t) of the birefringent crystals 502A and 502C may be about 1.304 mm while using the fibres with a cladding thickness of about 125 μm, which limits the pitch to about 127 μm.

In some embodiments the thickness of the birefringent crystals 502A and 502C are reduced, which may result in benefits in directivity and collection efficiency. In order to reduce the thickness t, the fibre array pitch is reduced, for example by using fibres with reduced cladding thickness. In an example, the thickness (t) of the birefringent crystals 502A and 502C is reduced to about 0.85 mm by using reduced cladding fibres with a cladding thickness of about 80 μm, which leads to a reduced fibre array pitch of about 82 μm. In some embodiments the thickness of the birefringent crystals 502A and/or 502C is between about 0.80 mm or 0.85 mm and about 0.90 mm or about 1.00 mm.

The two birefringent crystals 502A and 502C may have equal and opposite walk off angles to facilitate the recombination of the o-beam and e-beam. By way of illustration, in one arrangement with opposite walk-off angles, the non-reciprocal polarisation-rotating element 502B is set to rotate the outgoing beam but does not rotate the incoming beam. In another configuration, with equal walk off angles, the non-reciprocal polarisation-rotating element 502B is set to rotate the incoming beam but does not rotate the outgoing beam.

The optical circulator 500 may be used with varying ports and optical paths through the core. For example, the optical circulator 500 may be used in either of two ways corresponding to those described in Example 2 above. For example a fibre array optically coupled to the core may have two ports connected to a light source and one port connected to a light detector, or one port connected to a light source and two ports connected to a light detector or respective light detectors.

Additionally or alternatively, the order of the half-waveplate and the Faraday rotator may be switched, i.e. the non-reciprocal polarisation-rotating element 502B includes a Faraday rotator 502B1 and a half-waveplate element 502B2.

While the components of the optical circulator 500 are shown in FIG. 5 with substantially parallel sides, in other embodiments the components include non-parallel sides. At least one ("first") surface of the angled components is rotated relative to the direction of travel of the light through the optical circulator so the surface is not substantially transverse to the direction of travel of the light. The other surface ("second") may either be oriented transverse to the direction of travel of the light or the first and second surfaces may be at different angles, for example with the two surfaces forming a wedge or trapezoidal shape.

The optical circulator 500 may include a V-groove array (not shown) to align each of the SM, PM and/or MM optical fibres to the correspondence input and output ports of the core 502. The optical circulator 500 may include one or more focusing elements, such as an aspheric lens and/or parabolic mirror (not shown) to focus light onto the input port(s) and/or collimate light out of the output port(s).

System Example 3

Figure 6:
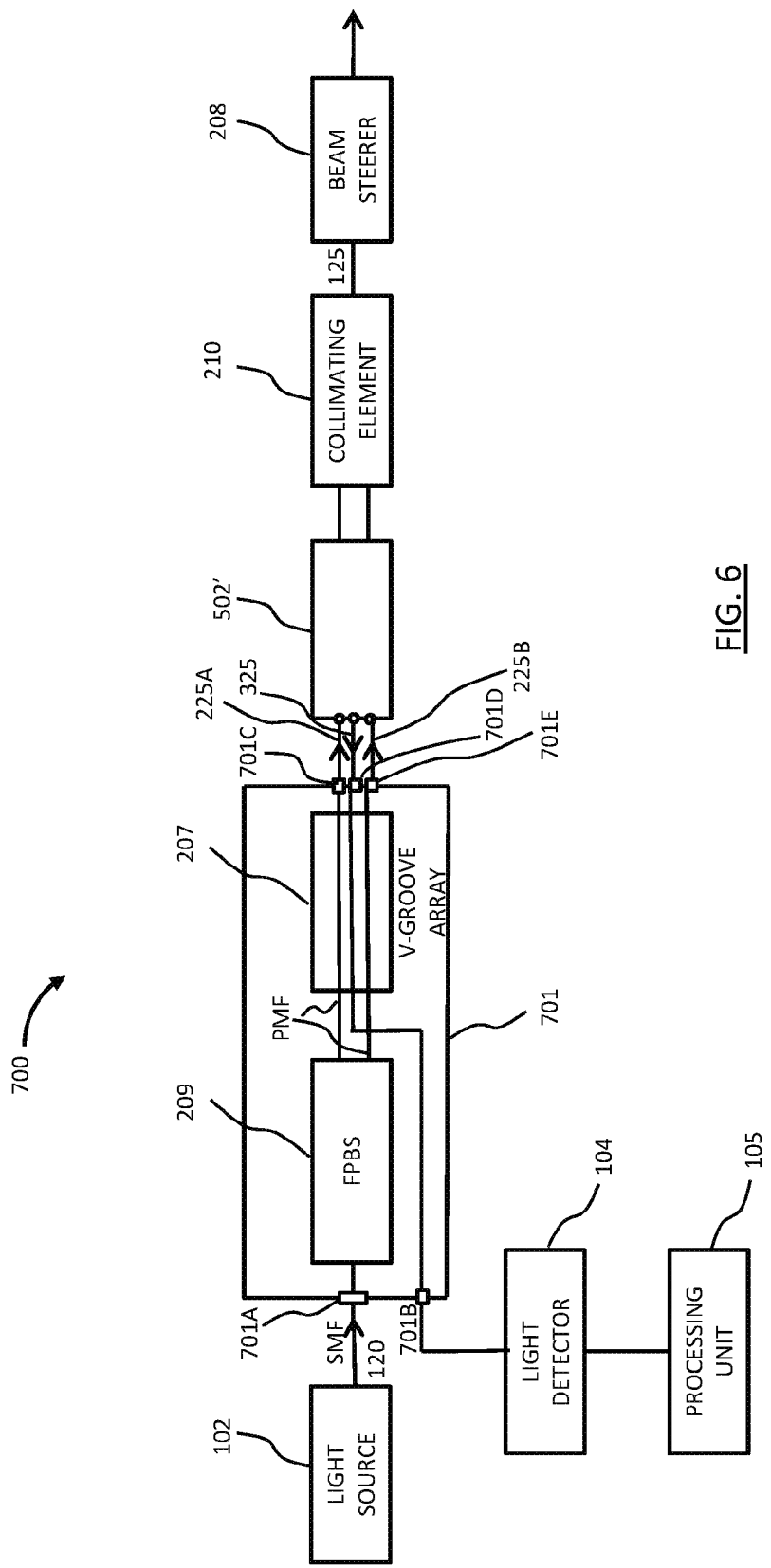
FIG. 6 illustrates another arrangement of a disclosed system to facilitate estimation of the spatial profile of an environment.

In another form, as illustrated in FIG. 6, the described system 700 includes an optical circulator 502', for example an optical circulator selected from the optical circulators herein described. In one embodiment the optical circular 502' includes two or more optical circulators, for example two or more optical circulators selected from the optical circulators herein described. In some embodiments the optical circulator 502' includes one or more optical circulators 502 as described with reference to FIG. 5.

In some embodiments an integrated component 701 includes a fibre polarisation beam splitter (FPBS) 209 and a 3-channel V-groove fibre array 207 where each channel is polarisation independent. The integration of the FPBS and fibre array may reduce fabrication cost and facilitate alignment. Use of the FPBS may also facilitate a simple and scalable optical circulator design. For example, the half-wave plates used in the optical circular may be selected as a uniform crystal rather than a split crystal or an array of crystals whereby each part is designed to separate polarisation states and treat each polarisation state differently. The integrated component 701 is arranged such that the light 120 from the light source 102 is fed to the integrated component 701 though a port 701A and the detector 104 is optically coupled to the integrated component 701 at its output port 701B. Two optical beams 225A and 225B with different polarisations are output from the integrated component 701 through ports 701C and 701E, respectively. The optical beams 225A and 225B are directly provided to the optical circulator 502'. That is, there are no mode expansion optical components, such as one or more lenses, placed between the fibre array and the optical circulator. One benefit of the absence of such mode expansion optical components may be eliminating light reflection at the surface of such components back to the system, which in turn may improve directivity. A port 701D receives light from the optical circulator 502'. The ports associated with the integrated component 701, i.e. 701A, 701B, 701C, 701D and 701E may be formed by fibre connectors and/or optical splicing.

In one embodiment, the outgoing light from a light detector 102 is transmitted over a single-mode fibre (SMF) to the integrated component 701. The output fibres of the FPBS 209 may be polarisation-maintaining fibres (PMFs). A receive fibre connected to the light detector may be selected from different fibre types including SMFs, PMFs, MM fibres (MMFs), double clad fibres (DCFs), and photonic lanterns (PLs). The selection may be based on the receive and detection methods adopted for the system.

In some embodiments a collimating element 210 is provided in communication with the optical circulator 502' to collimate light for the output ports of the optical circulator 502'.

In one embodiment the collimating element 210 is one or more lenses. The lens may have relatively large focal length and/or may be coated with an anti-reflective coating to limit the reflection at the lens surface back to the system.

Figure 7:
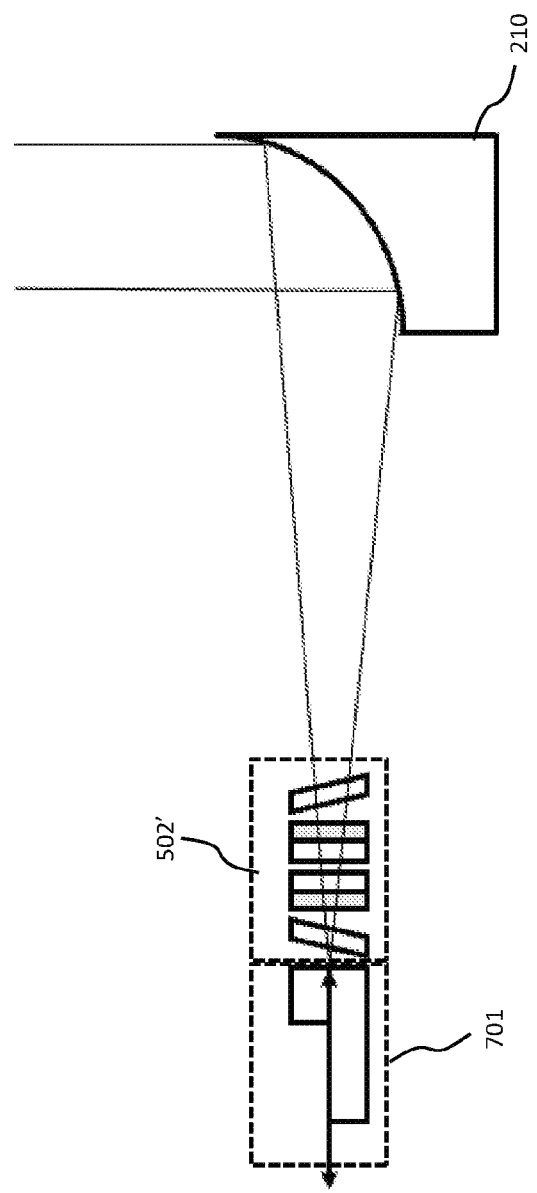
FIG. 7 illustrates another arraignment of a disclosed system to facilitate estimation of the spatial profile of an environment.

In another embodiment the collimating element 210 is a parabolic mirror, as shown in FIG. 7. In one arrangement a 90-degree parabolic mirror may be used as the collimating element 210. In other arrangements the parabolic mirror may have other reflection angles, such as 45 degrees. The parabolic mirror can collimate the light while ensuring that reflections do not travel back into the system.

In yet another embodiment the collimating element 210 is a focusing grating.

In still other embodiments the collimating element 210 may include a combination of at least two of lens, parabolic mirror and focussing grating. The combination may include one or more lenses and/or one or more parabolic mirrors and/or one or more focusing gratings.

In the example shown in FIG. 6, an outgoing light path 125 provides light to the environment via a beam steerer 208, for example a single beam steerer or a dual beam steerer. Light returned from the environment is directed to a detector 104 by the optical circulator 502'. A processing unit 105 then discriminates the detected light.

In other examples, two or more light sources may be provided, connected to one or more optical circulators. In these or other examples another form of optical circulator from the optical circulator 502 may be used. In some examples the optical circulators are of the same type. In other examples the optical circulators are of a different type.

Example 4

Figure 8:
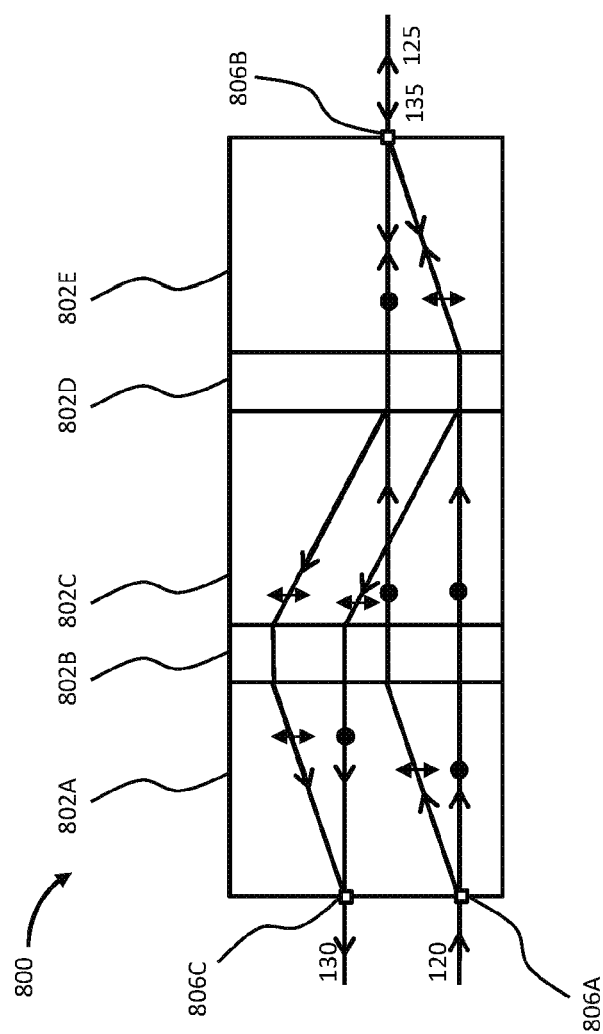
FIG. 8 illustrates an example optical circulator.

In another example, as illustrated in FIG. 8, an optical circulator 800 (which again may be the optical circulator 106 of FIG. 1) includes a first birefringent element 802A, a first non-reciprocal polarisation-rotating element 802B following the first birefringent element 802A, a second birefringent element 802C following the first non-reciprocal polarisation-rotating element 802B, a second non-reciprocal polarisation-rotating element 802D following the second birefringent element 802C, a third birefringent element 802E following the second non-reciprocal polarisation-rotating element 802D. The first, second and third birefringent elements 802A, 802C and 802E each have an optical axis aligned at 45 degrees to the outgoing light received at the input port 806A. Each of the first, second and third birefringent elements 802A, 802C and 802E may be a birefringent wedge.

In this example there is a crystal array at the non-reciprocal polarisation-rotating element 802B and 802D. This is in contrast with the other examples which are in a form that allows use of uniform crystals. In one arrangement, the non-reciprocal polarisation-rotating element 802B may include one or more Faraday rotators and/or a half-waveplate to facilitate the non-reciprocity.

The optical circulator 800 includes an input port 806A for receiving the outgoing light 120. The first birefringent element 802A separates the received light at the input port 806A into an o-beam and an e-beam by a walk-off angle. The first non-reciprocal polarisation-rotating element 802B rotates the e-beam to align its polarisation with that of the o-beam, and passes both o-beams to the second birefringent element 802C without being deflected but in parallel. The second non-reciprocal polarisation-rotating element 802D rotates the polarisation of the original o-beam to that of the e-beam but leaves the rotated o-beam rotated. The third birefringent element 802E deflects the rotated o-beam but not the rotated e-beam. The rotated o-beam and e-beam are combined at the bidirectional port 806B following the outgoing path 125. Reflected light following the incoming path 135 are separated by the third birefringent element 802E into an o-beam and an e-beam. The second non-reciprocal polarisation-rotating element 802D then further rotates the o-beam to align its polarisation with that of the e-beam, and passes both e-beams to the second birefringent element 802C which deflect both e-beams. One of the deflected e-beams are rotated by the first non-reciprocal polarisation-rotating element 802B to align its polarisation with that of an o-beam, which is then combined with the non-rotated e-beam at the output port 806C.

In one variant, the light source 102 is optically coupled to the optical circulator 800 at its input port 806A via a single-mode (SM) optical fibre. In the same or different variant, the detector 104 is optically coupled to optical circulator 800 at its output port 806C via a multimode (MM) optical fibre or SM fibre or PM fibre or DC fibre. A microlens array (not shown) collimates light for the input and output ports of the optical circulator 800 in order to adequately pass through the crystal arrays as needed. The optical circulator 800 may include an optical array, such as a V-groove array (not shown) to align at least one of the SM and MM optical fibres to the corresponding input and output ports 806A and 806C. The bidirectional port 806B couples the circulator to free space, via a collimating element.

Now that arrangements of the present disclosure are described, it should be apparent to the skilled person in the art that at least one of the described arrangements have one or more of the following advantages:

- Overlapping outgoing and incoming paths 125 and 135, which facilitate embodiments that avoid blind spots in the detection line or field of view.
- Eased alignment of outgoing and incoming paths 123 and 135, which for example facilitates embodiments more amenable to larger scale manufacture.
- High directivity between the input port(s) and the output port, which facilitate embodiments that avoid overwhelming the return signal.
- High collection efficiency.
- Relatively simple and/or scalable optical circulator structures.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. An optical system including:
   optical components that provide or receive light with a first polarisation over a first waveguide and provide or receive light with a second polarisation, different to the first polarisation, over a second waveguide;
   an optical circulator comprising:
   first and second ports connected to the first and second waveguides respectively without intervening mode expansion optical components;
   a third port;
   a bidirectional port; and
   an optical assembly that (a) directs the light received at the first and second ports to the bidirectional port and light received at the bidirectional port to the third port or (b) directs the light received at the third port to the bidirectional port and light received at the bidirectional port to the first and second ports, the optical assembly comprising a first birefringent crystal, a non-reciprocal polarisation-rotating element following the first birefringent crystal, and a second birefringent crystal following the non-reciprocal polarisation-rotating element, wherein the first birefringent crystal includes a first surface rotated by a first non-zero amount relative to a first axis transverse to a direction of travel of light from the first and second ports through the optical circulator and the second birefringent crystal includes a second surface rotated by a second non-zero amount, substantially the same as the first non-zero amount relative to the first axis, wherein the first surface and the second surface are rotated in opposite directions.

2. The optical system of claim 1, wherein the optical components comprise a light source arranged to direct light over a single mode optical fibre and a fibre polarisation beam splitter operatively connected to the first and second waveguides.

3. The optical system of claim 2, wherein the first and second ports are connected to the first and second waveguides by an optical array.

4. The optical system of claim 3, wherein the optical array is integral with the fibre polarisation beam splitter.

5. The optical system of claim 3, wherein the fibre polarisation beam splitter and the optical array are connected by polarisation-maintaining fibres.

6. The optical system of claim 1 the non-reciprocal polarisation-rotating element comprises a half-waveplate element and a Faraday rotator, wherein:
the half-waveplate element includes a third surface rotated by a third non-zero amount relative to a second axis, transverse to the direction of travel of light from the first and second ports through the optical circulator and orthogonal to the first axis, and
the Faraday rotator includes a fourth surface rotated by a fourth non-zero amount, substantially the same as the third non-zero amount relative to the second axis, wherein the third surface and the fourth surface are rotated in opposite directions.

7. A system for facilitating estimation of a spatial profile of an environment, the system including:
a light source configured to provide outgoing light;
one or more light detectors configured to detect incoming light, the incoming light corresponding to at least part of the outgoing light reflected by the environment; and
an optical system including:
optical components that provide or receive light with a first polarisation over a first waveguide and provide or receive light with a second polarisation, different to the first polarisation, over a second waveguide;
an optical circulator comprising:
first and second ports connected to the first and second waveguides respectively without intervening mode expansion optical components;
a third port;
a bidirectional port; and
an optical assembly that (a) directs the light received at the first and second ports to the bidirectional port and light received at the bidirectional port to the third port or (b) directs the light received at the third port to the bidirectional port and light received at the bidirectional port to the first and second ports, the optical assembly comprising a first birefringent crystal, a non-reciprocal polarisation-rotating element following the first birefringent crystal, and a second birefringent crystal following the non-reciprocal polarisation-rotating element, wherein the first birefringent crystal includes a first surface rotated by a first non-zero amount relative to a first axis transverse to a direction of travel of light from the first and second ports through the optical circulator and the second birefringent crystal includes a second surface rotated by a second non-zero amount, substantially the same as the first non-zero amount relative to the first axis, wherein the first surface and the second surface are rotated in opposite directions.

8. The system of claim 7, wherein the light source is arranged to direct light over a single mode optical fibre and a fibre polarisation beam splitter operatively connected to the first and second waveguides.

9. The system of claim 8, wherein the first and second ports are connected to the first and second waveguides by an optical array.

10. The system of claim 9, wherein the optical array is integral with the fibre polarisation beam splitter.

11. The system of claim 9, wherein the fibre polarisation beam splitter and the optical array are connected by polarisation-maintaining fibres.

12. The system of claim 7 wherein the non-reciprocal polarisation-rotating element comprises a half-waveplate element and a Faraday rotator, wherein:
the half-waveplate element includes a third surface rotated by a third non-zero amount relative to a second axis, transverse to the direction of travel of light from the first and second ports through the optical circulator and orthogonal to the first axis, and
the Faraday rotator includes a fourth surface rotated by a fourth non-zero amount, substantially the same as the third non-zero amount relative to the second axis, wherein the third surface and the fourth surface are rotated in opposite directions.

13. The system of claim 7 wherein the one or more light detectors facilitate detection of a rate of depolarisation of the incoming light.

14. The system of claim 13 wherein the outgoing light reflected by the environment includes light reflected by a surface of the environment, and wherein the system further includes a processor for determining, based on the detected rate of depolarisation, the surface to be a metallic surface, non-metallic or specular surface.

* * * * *